United States Patent
Razavi

(10) Patent No.: US 6,245,870 B1
(45) Date of Patent: Jun. 12, 2001

(54) PROCESS FOR PRODUCING SYNDIOTACTIC/ISOTACTIC BLOCK POLYOLEFINS

(75) Inventor: Abbas Razavi, Mons (BE)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 08/474,955

(22) Filed: Jun. 7, 1995

Related U.S. Application Data

(63) Continuation-in-part of application No. 08/459,575, filed on Jun. 2, 1995, now Pat. No. 6,184,326, which is a continuation-in-part of application No. 08/379,828, filed on Jan. 27, 1995, now abandoned, which is a continuation of application No. 07/854,150, filed on Mar. 20, 1992, now Pat. No. 5,476,914.

(51) Int. Cl.$^7$ .............................. C08F 4/64; C08F 110/06
(52) U.S. Cl. .................... 526/127; 526/160; 526/351; 526/904
(58) Field of Search .................... 526/127, 160, 526/904, 351

(56) References Cited

U.S. PATENT DOCUMENTS

| | | | |
|---|---|---|---|
| 5,036,034 | * 7/1991 | Ewen | 526/160 |
| 5,416,228 | * 5/1995 | Ewen et al. | 526/160 |
| 5,459,117 | 10/1995 | Ewen | 526/160 X |

FOREIGN PATENT DOCUMENTS

| | | | |
|---|---|---|---|
| 2017192 | * 11/1990 | (CA) | . |
| 3916553 | * 11/1990 | (DE) | . |
| 0405201 | 1/1991 | (EP) | . |
| 0433986 | 6/1991 | (EP) | . |

OTHER PUBLICATIONS

Polymerization of Propene with Zirconocene–containing Supported Catalysts Activated by Common Trialkylaluminiums; Soga, et al., Makromol Chem., vol. 194, No. 6, pp. 1745–1755 (1993).

Stereospecific Polymerization of Propylene in the Presence of Homogeneous Catalysts; Ligand–Monomer Enantioselective Interactions; Macromolecules, Longo, et al., pp. 4624–4625 (1991).

* cited by examiner

*Primary Examiner*—Fred Teskin
(74) *Attorney, Agent, or Firm*—Jim D. Wheelington

(57) ABSTRACT

The invention provides a metallocene catalyst for use in preparing syndiotactic/isotactic block polyolefins. The catalyst comprises a bridged metallocene in which one of the cyclopentadienyl rings is substituted in a substantially different manner from the other ring and the cyclopentadienyl rings have lack of bilateral or pseudo-bilateral symmetry. The catalyst comprises a metallocene compound generally described by the formula $R''(C_5R_4)(C_4R'_4C_5C_4R'_4)MeQ_p$ wherein $(C_5R_4)$ is a substituted cyclopentadienyl ring; $(C_4R'_mC_5C_4R'_n)$ is a fluorenyl ring or substituted fluorenyl ring; each R and R' is hydrogen or hydrocarbyl radical having from 1–20 carbon atoms, a halogen, an alkoxy, and alkoxy alkyl or an alkylamino radical, each R and R' may be the same or different; $(C_5R_4)$ has a lack of bi-lateral symmetry; R" is a structural bridge between the $(C_5R_4)$ and $(C_4R'_4C_5C_4R'_4)$ rings to impart stereorigidity and, preferably, is a hydrocarbyl biradical having at least one carbon atom to form the bridge; Q is a hydrocarbyl radical, such as an alkyl, aryl, alkenyl, alkylaryl or arylalkyl radical having 1–20 carbon atoms or is a halogen; Me is a Group IIIB, IVB, VB, or VIB metal as positioned in the Periodic Table of Elements; and p is the valence of Me minus 2. This catalyst is syndio-/iso-specific and produces a syndiotactic/isotactic block polymer.

29 Claims, No Drawings

PROCESS FOR PRODUCING SYNDIOTACTIC/ISOTACTIC BLOCK POLYOLEFINS

This is a continuation-in-part of application Ser. No. 08/379,828, filed on Jan. 27, 1995, now abandoned, and a continuation-in-part of application Ser. No. 08/459,575, filed on Jun. 2, 1995, now U.S. Pat. No. 6,184,326, which is a continuation of application Ser. No. 07/854,150, filed Mar. 20, 1992, now U.S. Pat. No. 5,476,914.

BACKGROUND OF THE INVENTION

1. Field of the Invention

The inventions relates to a metallocene catalyst useful in preparing syndiotactic/isotactic block polyolefins. The catalyst comprises a bridged metallocene in which one of the cyclopentadienyl rings is substituted in a different manner from the other ring. The invention further includes a process of preparing syndiotactic/isotactic block polyolefins that comprises the use of the disclosed catalysts.

2. Description of the Prior Art

The present invention provides a process for polymerizing olefins having three or more carbon atoms to produce a polymer with a syndiotactic/isotactic stereochemical configuration. The catalyst and process are particularly useful in polymerizing propylene to form a syndiotactic/isotactic block polypropylene.

As known in the art, syndiotactic polymers have a unique stereochemical structure in which monomeric units having enantiomorphic configuration of the asymmetrical carbon atoms follow each other alternatively and regularly in the macromolecular main chain. Syndiotactic polypropylene was first disclosed by Natta et al. in U.S. Pat. No. 3,258,455. The Natta group obtained syndiotactic polypropylene by using a catalyst prepared from titanium trichloride and diethyl aluminum monochloride. A later patent to Natta et al., U.S. Pat. No. 3,305,538, discloses the use of vanadium triacetylacetonate or halogenated vanadium compounds in combination with organic aluminum compounds for producing syndiotactic polypropylene. U.S. Pat. No. 3,364,190 to Emrick discloses a catalyst system composed of finely divided titanium or vanadium trichloride, aluminum chloride, a trialkyl aluminum and a phosphorus-containing Lewis base as producing syndiotactic polypropylene. U.S. Pat. No. 4,892,851 disclosed a metallocene catalyst for producing highly crystalline syndiotactic polyolefins.

As disclosed in these patent references and as known in the art, the structure and properties of syndiotactic polypropylene differ significantly from those of isotactic polypropylene. The isotactic structure is typically described as having the methyl groups attached to the tertiary carbon atoms of successive monomeric units on the same side of a hypothetical plane through the main chain of the polymer, e.g., the methyl groups are all above or below the plane. Using the Fischer projection formula, the stereochemical sequence of isotactic polypropylene is described as follows:

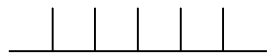

Another way of describing the structure is through the use of NMR. Bovey's NMR nomenclature for an isotactic pentad is . . . mmmm . . . with each "m" representing a "meso" dyad or successive methyl groups on the same side in the plane. As known in the art, any deviation or inversion in the structure of the chain lowers the degree of isotacticity and crystallinity of the polymer.

In contrast to the isotactic structure, syndiotactic polymers are those in which the methyl groups attached to the tertiary carbon atoms of successive monomeric units in the chain lie on alternate sides of the plane of the polymer. Using the Fischer projection formula, the structure of a syndiotactic polymer is designated as:

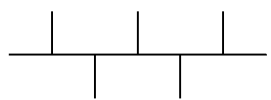

In NMR nomenclature, this pentad is described as . . . rrrr . . . in which each "r" represents a "racemic" dyad, i.e., successive methyl groups on alternate sides of the plane. The percentage of r dyads in the chain determines the degree of syndiotacticity of the polymer. Syndiotactic polymers are crystalline and, like the isotactic polymers, are insoluble in xylene.

This crystallinity distinguishes both syndiotactic and isotactic polymers from an atactic polymer that is soluble in xylene. Atactic polymer exhibits no regular order of repeating unit configurations in the polymer chain and forms essentially a waxy product. While it is possible for a catalyst to produce all three types of polymer, it is desirable for a catalyst to produce isotactic or syndiotactic polymer with very little atactic polymer.

Catalysts that produce isotactic polyolefins are disclosed in European Patent Application Publication No. 284,708 corresponding to U.S. patent application Ser. No. 034,472 filed Apr. 3, 1987, and now abandoned; U.S. Pat. No. 4,794,096; and European Patent Application Publication No. 310,734 corresponding to U.S. patent application Ser. No. 095,755 filed on Sep. 11, 1987, and now abandoned. These applications disclose chiral, stereorigid metallocene catalysts that polymerize olefins to form isotactic polymers and are especially useful in the polymerization of a highly isotactic polypropylene. The present invention, however, provides a different class of metallocene catalysts that are useful in the polymerization of syndiotactic/isotactic block polyolefins, and more particularly syndiotactic/isotactic block polypropylene.

SUMMARY OF THE INVENTION

The present invention provides a catalyst and process for preparing syndiotactic/isotactic block polyolefins, and more particularly syndiotactic/isotactic block polypropylene. The catalyst and process produce a polymer with differing syndio-/iso-block ratios.

The catalyst comprises a metallocene, i.e., a metal derivative of a cyclopentadiene, and an ionizing agent. The metallocene compound should contain two cyclopentadienyl rings and be of the general formula:

wherein $(C_5R_4)$ is a substituted cyclopentadienyl ring; $(C_4R'_mC_5C_4R'_n)$ is a fluorenyl or substituted fluorenyl ring; each R and R' is hydrogen or hydrocarbyl radical having from 1–20 carbon atoms, a halogen, an alkoxy, and alkoxy alkyl or an alkylamino radical, each R and R' may be the same or different; $(C_5R_4)$ has a lack of bi-lateral symmetry; R" is a structural bridge between the $(C_5R_4)$ and $(C_4R'_4C_5C_4R'_4)$ rings to impart stereorigidity and, preferably is a hydrocarbyl biradical having at least one carbon atoms to form the bridge; Q is a hydrocarbyl radical, such as an alkyl, aryl, alkenyl, alkylaryl or arylalkyl radical having 1–20 carbon atoms or is a halogen; Me is a Group IIIB, IVB, VB, or VIB metal as positioned in the Periodic Table of Elements; and p is the valence of Me minus 2.

The present invention further provides a process for producing syndiotactic/isotactic block polyolefins, particularly syndiotactic/isotactic polypropylene. The process comprises utilizing at least one of the catalysts described by the above formula and introducing the catalyst into a polymerization reaction zone containing an olefin monomer. In addition, a cocatalyst such as alumoxane may be introduced into the reaction zone. Further, the catalyst may also be pre-polymerized prior to introducing it into the reaction zone and/or prior to the stabilization of reaction conditions in the reactor.

Metallocene catalysts are single site catalyst which, generally, produce polymer having narrow molecular weight distribution.

DETAILED DESCRIPTION OF THE INVENTION

The present invention provides a catalyst and process for the production of syndiotactic/isotactic block polyolefins, particularly polypropylene. The catalysts of the present invention produce a polymer with a syndiotactic/isotactic block microstructure.

When propylene or other alpha-olefins are polymerized using a catalyst consisting of a transition metal compound, the polymer product typically comprises a mixture of amorphous atactic and crystalline xylene insoluble fractions. The crystalline fraction may contain either isotactic or syndiotactic polymer or a mixture of both. Highly isospecific metallocene catalysts are disclosed in European Patent Application Publication No. 284,708 corresponding to U.S. patent application Ser. No. 034,472 filed Apr. 3, 1987, and now abandoned; U.S. Pat. No. 4,794,096; and European Patent Application Publication No. 310,734 corresponding to U.S. patent application Ser. No. 095,755 filed on Sep. 11, 1987, and now abandoned. In contrast to the catalysts disclosed in those applications, the catalysts of the present invention are syndio-/iso-specific and produce a polymer with differing syndio-/iso-tactic block ratios. It was discovered that syndiotactic polymers generally have lower heats of crystallization than the corresponding isotactic polymers.

The metallocene catalysts of the present invention may be described by the formula

wherein $(C_5R_4)$ is a substituted cyclopentadienyl ring; $(C_4R'_mC_5C_4R'_n)$ is a fluorenyl ring, substituted or unsubstituted; each R and R' is hydrogen or hydrocarbyl radical having from 1–20 carbon atoms, a halogen, an alkoxy, and alkoxy alkyl or an alkylamino radical, each R and R' may be the same or different; $(C_5R_4)$ has a lack of bi-lateral symmetry; R" is a structural bridge between the $(C_5R_4)$ and $(C_4R'_4C_5C_4R'_4)$ rings to impart stereorigidity and, preferably, is a hydrocarbyl biradical having at least one carbon atoms to form the bridge; Q is a hydrocarbyl radical, such as an alkyl, aryl, alkenyl, alkylaryl or arylalkyl radical having 1-20 carbon atoms or is a halogen; Me is a Group IIIB, IVB, VB, or VIB metal as positioned in the Periodic Table of Elements; and p is the valence of Me minus 2.

In order to be syndiospecific, it was believed that a metallocene catalyst precursor must have stereorigidity, prochirality, i.e., capability of becoming chiral during catalysis, and bilateral symmetry. While the catalyst itself must be chiral as show below bilateral symmetry of the catalyst is not necessarily required.

Stereorigidity is imparted to prevent rotation of the cyclopentadienyl rings about their coordination axes and may be obtained by several ways. Stereorigidity may be obtained by substituted cyclopentadienyl rings in which the substituent groups provide stearic hindrance by nonbonded spatial interaction between the substituted cyclopentadienyl rings or by virtue of the bulk of the substituent groups. Stereorigidity may also be obtained by the cyclopentadienyl rings being in a state of low kinetic energy.

Stereorigidity may be obtained by means of a structural bridge between the cyclopentadienyl rings which connects them and fixes their location relative to one another.

To obtain chirality the cyclopentadienyl rings in the metallocene catalysts must be substituted in a substantially different manner so that there is a steric difference between the two Cp rings, and therefore, $(C_4R'_4C_5C_4R'_4)$ is a substantially different substituted ring than $(C_5R_4)$. Thus, by "steric difference" or "sterically different" as used herein, it is intended to imply a difference between the steric characteristics of the Cp rings that controls the approach of each successive monomer unit that is added to the polymer chain. The steric difference between the Cp rings acts to orient the approaching monomer from a random approach and controls the coordination such that the monomer is added to the continuously migrating polymer chain in the syndiotactic configuration.

Bilateral symmetry is defined as the condition in which there is no substituents or one or more substituents on one side and no substituents or one or more substituents on the other side in the same relative position such that a mirror image is formed from one side to another. One example of such a compound is isopropyl (cyclopentadienyl-9-fluorenyl)zirconium dichloride, abbreviated iPr[Cp(Flu)]ZrCl$_2$. An illustration of the ligands of this compound is shown below:

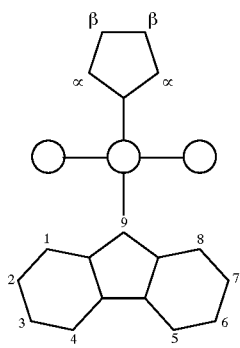

Bilateral symmetry is illustrated by a plane bisecting the zirconium metal and the bridge resulting the right side of each ligand being a mirror image of its left side. The α and β position of the cyclopentadienyl ring represent the position of possible substituents in the proximal and distal position, respectively. The numerical positions of the fluorenyl ring represent the position of possible substituents on the fluorenyl ring, 9 being the position of the bridge.

Without intending to limit the scope of the present invention as indicated by the claims, it is believed that in the polymerization reaction the growing polymer chain intermittantly migrates as the catalyst simultaneously isomerizes and enchains sequences of polymer of the syndiotactic structure within a predominantly isotactic polymer chain. This mechanism differs from that of known syndiospecific catalysts such as the active species formed from isopropylidene[cyclopentadienyl-9-fluorenyl] zirconium dichloride as disclosed in U.S. Pat. No. 4,892,851 where the unsubstituted cyclopentadienyl ring exhibits mainly pentahapto bonding, i.e., all five carbon atoms of the cyclopentadienyl rings are coordinated with the zirconium atom. It is believed that substituents on the cyclopentadienyl rings such a methyl as disclosed in U.S. Pat. No. 5,036,034 can interfere with chain migratin in a periodic manner such that the resulting polymer will have no more than approximately 50% isotacticity. It is believed that bulkier substituents on the cyclopentadienyl ring such as t-butyl as disclosed in U.S. Pat. No. 5,416,228 prevent the migration of the polymer chain which results in the formation of the isotactic microstructure.

Due to the eletrosteric (nonbonding electronic and spatial) repulsion of the growing polymer chain with distal substituents of the cyclopentadienyl ring, the coordination with the transition metal atom, e.g., zirconium, may become a trihapto (3 carbon atoms, i.e., the bridgehead and the proximal carbon atoms) or even a monohapto (one carbon atom, i.e., the bridgehead carbon atom) bond. For a substituent which is bulkier than t-butyl, such as trimethylsilyl, the electrosteric effect is greater and the coordination with the transition metal atom can become a monohapto bond. The cyclopentadienyl ligand which had been stereorigid with a pentahapto or even a trihapto bond with the transition metal is allowed to rotate with a monohapto bond. Rotation of the cyclopentadienyl ring results in R and S configuration, i.e., mirror image, isomers. Both isomers would be isospecific catalysts; however, while the cyclopentadienyl ring is in a state of free rotation the bulky substituent in effect does not participate in so far as formation of the polymer chain since it has been repelled by the polymer chain and its steric and electronic effects are no longer acting to orient the polymer chain. Consequently, during this transition state a catalyst such as that formed from isopropylidene [3-trimethylsilyl cyclopentadienyl-9-fluorenyl]zirconium dichloride behaves as having an unsubstituted cyclopentadienyl ring ligand and is equivalent in function to a catalyst such as that formed from isopropylidene [cyclopentadienyl-9-fluorenyl] zirconium dichloride in that the polymer chain can migrate and the syndiotactic microstructure is formed. The resulting polymer chain is formed in blocks of isotactic microstructure when the R or S isomer is present as a catalyst and blocks of syndiotactic microstructure during the transition state between the R and S isomer when the cyclopentadienyl ligand is in free rotation and the polymer chain can migrate.

It is believed that the catalysts of the present invention demonstrate a reversible transformation of isospecific sites to syndiospecific sites through a chain deblockage/blockage mechanism. In theory, the growing chain intermittantly becomes mobile and migrates between the two lateral coordination positions after each insertion and, simultaneously, the distal substitutent oscillates between the two cyclopentadienyl β positions. This β-substituent/polymer chain displacement enchains syndiotactic sequences in a predominantly isotactic polymer chain by a gradual change in haptotropy of the bonding between the cyclopentadienyl and zirconium from pentahapto to tri- and mono-hapto bonding which results in rotation of the cyclopentadienyl rings about the bond between the bridgehead carbon atom and the bridge. This dynamic behavior provides in effect a temproary enantiotopic environment and syndiotactic polymer is formed. When there is a static environment with the distal substituent in one of the two 6 positions or the polymer chain in one of the two lateral coordination sites, the catalyst is isotactic specific. Theoretically, only when both events, i.e., loss of stereorigidity and chain migration, occur together is the stereospecific character of the catalyst temporarily altered.

When catalysts of the present invention are used in polymerization of olefins, the polymer which results is of a syndio-/iso-tactic microstructure as illustrated below:

In a preferred catalyst of the present invention, $(C_5R_4)$ is preferably a substituted cyclopentadienyl ring with a substituent in the distal position being at least as bulky as trimethylsilyl; $(C_4R'_m C_5 C_4R'_n)$ is preferably an unsubstituted fluorenyl radical; Me is preferably titanium, zirconium or hafnium, more preferably zirconium or hafnium and most preferably zirconium; Q is preferably a halogen and is most preferably chlorine; p may vary with the valence of the metal atom but is preferably 2; and R" is preferably an a hydrocarbyl biradical of at least one carbon atom which is coordinated with $(C_5R_4)$ and with $(C_4R'_m C_5 C_4R'_n)$, preferably an unsubstituted isopropylio or diphenylmethylio biradical.

As used in the present invention, the term "bulky" refers to spatial displacement so that a substituent being at least as bulky as another would mean that the substituent would have a spatial displacement at least as great as the other. Examples of such substituents in present invention are represented by the general formula SiR*3 wherein R* is a hydrocarbyl radical having from 1–20 carbon atoms, such hydrocarbyl radical being linear or cyclic, substituted or unsubstituted. R* may be the same or different but preferably is the same. R* preferably is an alkyl of 1–3 carbon atoms and more preferably is methyl. Other atoms (X) may be substituted for silicon (Si) as long as the total spatial displacement of XR*y where y is the valence of X minus 1 is equal to or greater than trimethylsilyl radical [(CH$_3$)$_3$Si—].

Exemplary hydrocarbyl biradicals for the structural bridge include ethyl, propyl, butyl, pentyl, hexyl, heptyl, octyl, nonyl, decyl, and the like. Other hydrocarbyl radicals useful as the structural bridge in the present catalysts include linear alkyl radicals of 1–10 carbon atoms or branched alkyl radicals of 1–20 carbon atoms, preferably one carbon atom, which may be substituted or unsubstituted, preferably subsituted. (C$_4$R'$_4$C$_5$C$_4$R'$_4$) comprises hydrocarbyl radicals bonded to two adjacent carbon atoms in a cyclopentadienyl ring to form a fused ring.

The catalyst may be prepared by any method known in the art. Generally, the preparation of the catalyst complex consists of forming and isolating the Cp or substituted Cp ligands which are then reacted with a halogenated metal to form the complex. The preferred method is that disclosed in U.S. Pat. Nos. 4,892,851 and 5,117,020, hereby incorporated by reference.

The metallocene catalysts of the present invention are useful in many of the polymerization processes known in the art including many of those disclosed for the preparation of isotactic polypropylene. When the catalysts of the present invention are used in these types of processes, the processes produce syndiotactic/isotactic block polymers rather than isotactic or syndiotactic polymers. Further examples of polymerization processes useful in the practice of the present invention include those disclosed in U.S. Pat. No. 4,767,735 and European Patent Application Publication No. 310,734 corresponding to U.S. patent application Ser. No. 095,755 filed on Sep. 11, 1987, and now abandoned, the disclosures of which are hereby incorporated herein by reference. These preferred polymerization procedures include the step of prepolymerizing the catalyst and/or precontacting the catalyst with a cocatalyst and an olefin monomer prior to introducing the catalyst into a reaction zone.

The ionizing agent is an alumoxane, an aluminum alkyl, other Lewis acid or a combination thereof which will ionize a neutral metallocene compound to form a cationic metallocene catalyst. Examples of such ionizing agents are methyl alumoxane (MAO), triethyl aluminum (TEAl) and tris (pentafluorophenyl)boron. Other ionizing agents are disclosed in U.S. patent application Ser. No. 07/419,057 filed on Oct. 10, 1989, now abandoned and Ser. No. 07/419,222 filed on Oct. 30, 1989, now abandoned and European Patent Publication Nos. 0-277-003 and 0-277-004 which are hereby incorporated by reference.

The syndio-/iso-specific catalysts of the present invention are particularly useful in combination with an aluminum cocatalyst, preferably an alumoxane. In addition, a complex may be isolated between a metallocene catalyst as described herein and an aluminum cocatalyst in accordance with the teachings of European Patent Publication Number 226,463 published on Jun. 24, 1987. As disclosed therein, a metallocene is reacted with an excess of alumoxane in the presence of a suitable solvent. A complex of the metallocene and alumoxane may be isolated and used as a catalyst in the present invention.

The alumoxanes useful in combination with the catalysts of the present invention, either in the polymerization reaction or in forming the complex disclosed above, may be represented by the general formula (R—Al—O—)$_n$ in the cyclic form and R(R—Al—O—)$_n$ALR$_2$ in the linear form wherein R is an alkyl group with one to five carbon atoms and n is an integer from 1 to about 20. Most preferably, R is a methyl group and the preferred alumoxane is methylalumoxane (MAO). The alumoxanes can be represented structurally as follows:

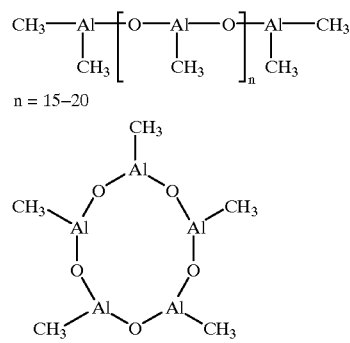

n = 15–20

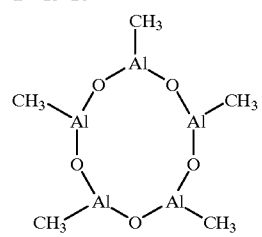

The alumoxanes can be prepared by various methods known in the art. Preferably, they are prepared by contacting water with a solution of trialkyl aluminum, such as, trimethyl aluminum, in a suitable solvent such as a benzene. Another preferred method includes the preparation of alumoxane in the presence of a hydrated copper sulfate as described in the U.S. Pat. No. 4,404,344 the disclosure of which is hereby incorporated by reference. This method comprises treating a dilute solution of trimethyl aluminum in toluene with copper sulfate. The preparation of other aluminum cocatalysts useful in the present invention may be prepared by methods known to those skilled in the art.

The Examples given below illustrate the present invention and its various advantages and benefits in more detail. The synthesis procedure was performed under an inert gas atmosphere using a Vacuum Atmospheres glovebox or Schlenk techniques. The synthesis process generally comprises the steps of (1) preparing the halogenated or alkylated metal compound, (2) preparing the ligand, (3) synthesizing the complex, and (4) purifying the complex. Catalysts produced by these methods are isopropylidene [3-TMScyclopentadienyl-9-fluorenyl]Me dichloride and diphenyl methylidene[3-TMScyclopentadienyl-9-fluorenyl]Me dichloride wherein Me is zirconium or hafnium depending on the example. The ligand was prepared via a two step reaction. Double aromatization of this compound with two equivalents of methyllithium in THF solution gives the respective dianion. The reaction of the dianion with a suspension of ZrCl$_4$ in pentane yields a red zirconium complex. The yellow hafnium complex is obtained when HfCl$_4$ was used in the same reaction.

The invention having been generally described, the following examples are given as particular embodiments of the invention and to demonstrate the practice and advantages thereof. It is understood that the examples are given by way of illustration and are not intended to limit the specification or the claims to follow in any manner.

Synthesis of Isopropylidene [3-trimethylsilylcyclopentadienyl-9-fluorenyl] Zirconium Dichloride In a one liter flask equipped with a magnetic stirrer and a nitrogen inlet, 55 grams (0.3 mole) of fluorene is dissolved in 100 milliliters of tetrahydrafuran (THF). An equimolar amount of methyllithium (MeLi) in ether is added dropwise and the resulting red reaction mixture is stirred overnight. 0.3 mole of 6,6-dimethyl-3-trimethylsilylcyclopentadienylfulvene in THF was introduced at −78° C. under nitrogen. The reaction mixture was allowed to attain slowly the ambient temperature. The reaction mixture was stirred overnight and hydrolyzed with an aqueous, saturated solution of ammonium chloride. Subsequently the organic phase was separated with ether and dried over MgSO$_4$. The evaporation of the solvents yielded an offwhite solid (91.7% yield).

The ligand prepared above without further purification was dissolved in 100 milliliters of THF and treated with two equimolar quantities of MeLi in ether under nitrogen. The red reaction mixture was stirred overnight. After evaporation of THF a red solid was obtained that was washed with several small portions of ether until it become powdery. The powder was suspended in 200 milliliters of pentane and reacted with an equimolar amount of zirconium tetrachloride (ZrCl$_4$). A crude product was obtained which was dissolved in methylene chloride (MeCl$_2$) and filtered to separate the lithium chloride (LiCl) byproduct. The solution was cooled to −20° C. and very pure metallocene as red crystals was obtained (60.0% yield). Structure and composition were determined by $^1$H NMR and X-ray diffractions Synthesis of Diphenylmethylidene[3-trimethylsilyl Cyclopentadienyl-9-fluorenyl] Zirconium Dichloride The same procedure above was used except that 6,6-diphenyl-3-trimethylsilylcyclopentadienylfulvene was used. Yields were 52% for the ligand preparation and 95.7% for the catalyst.

Synthesis of Isopropylidene [3-trimethylsilylcyclopentadienyl-9-fluorenyl] Hafnium Dichloride or diphenylmethylidene[3-trimethylsilyl Cyclopentadienyl-9-fluorenyl] Hafnium Dichloride The same procedure above was used except that hafnium tetrachloride (HfCl$_4$) was used.

POLYMERIZATION

EXAMPLE 1

Propylene was polymerized using 2 milligrams of isopropylidene (3-TMScyclopentadienyl-fluorenyl)zirconium dichloride produced by the method above. One liter of liquid propylene was introduced into a Buechi reactor at room temperature. The catalyst was placed in three milliliters of a 11% MAO in toluene to form a solution which was added to the reactor and the temperature increased to 40° C. The polymerization reaction was allowed to run for 60 minutes during which time the reactor was maintained at 60° C. The reaction was terminated by venting the reactor of monomer. The catalyst activity in kilograms of polypropylene per grams of catalyst per hour was calculated. The molecular weight, molecular weight distribution, and $^{13}$CNMR analysis of the polymer were determined. The results are shown in Tables 1 and 2.

EXAMPLE 2

The procedure of Example 1 was followed except the polymerization temperature was 60° C. The results are shown in Tables 1 and 2.

EXAMPLE 3

The procedure of Example 1 was followed except the polymerization temperature was 80° C. The results are shown in Tables 1 and 2.

EXAMPLE 4

The procedure of Example 1 was followed except that diphenylmethylidene[3-trimethylsilylcyclopentadienyl-9-fluorenyl] zirconium dichloride was used as the catalyst and 5Nl of hydrogen was used during polymerization. The results are shown in Tables 3 and 4.

EXAMPLE 5

The procedure of Example 4 was followed except that the polymerization temperature was 60° C. The results are shown in Tables 3 and 4.

EXAMPLE 6

The procedure of Example 5 was followed except that 1Nl of hydrogen was used. The results are shown in Tables 3 and 4.

EXAMPLE 7

The procedure of Example 4 was followed except that the polymerization temperature was 80° C. and 0Nl of hydrogen was used.

The results are shown in Tables 3 and 4.

EXAMPLE 8

The procedure of Example 4 was followed except that the polymerization time was 10 minutes, the polymerization temperature was 80° C. and 1Nl of hydrogen was used. The results are shown in Tables 5 and 6.

EXAMPLE 9

The procedure of Example 8 was followed except that the polymerization time was 20 minutes. The results are shown in Tables 5 and 6.

EXAMPLE 10

The procedure of Example 8 was followed except that the polymerization time was 30 minutes. The results are shown in Tables 5 and 6.

EXAMPLE 11

The procedure of Example 8 was followed except that the polymerization time was 60 minutes. The results are shown in Tables 5 and 6.

EXAMPLE 12

The procedure of Example 8 was followed except that the polymerization time was 90 minutes. The results are shown in Tables 5 and 6.

EXAMPLE 13

The procedure of Example 8 was followed except that the polymerization time was 120 minutes. The results are shown in Tables 5 and 6.

EXAMPLE 14

The polymer of Example 11 was fractionated with different solvents. The results are shown in Table 7.

EXAMPLE 15

The polymer of Example 13 was fractionated with different solvents. The results are shown in Table 8.

tion of isospecific catalyst to syndiospecific during the polymerization or favoring the double migration mechanism. In the former case syndiotactic polymer should be extractable from the "mixed" polymer. In the latter case, it should not be extractable.

The isotacticity as measured by "mmmm" pentad distribution is greater than 50%. The syndiotacticity as measured by "rrrr" pentad distribution is from about 1 to about 1.7%.

TABLE 3

| Example | Poly. Temp. (° C.) | Act. (Kg/g) | Mw (kDa) | MWD -- | Mp (° C.) | mmmm % | rrrr % |
|---|---|---|---|---|---|---|---|
| 4 | 40 | 30 | 23 | 2.8 | 89 | 51.63 | 4.10 |
| 5 | 60 | 56 | 80 | 3.3 | 91 | 56.47 | 3.96 |
| 6 | 60 | 85 | 59 | 2.4 | 102 | 59.81 | 3.42 |
| 7 | 80 | 71 | 52 | 3.8 | 116 | 63.13 | 6.00 |

TABLE 4

| Example | mmmm | rmmm | rmmr | mmrr | rmrr + mrmm | mrmr | rrrr | mrrr | mrrm |
|---|---|---|---|---|---|---|---|---|---|
| 4 | 51.63 | 14.40 | 1.68 | 14.35 | 2.50 | 1.08 | 4.10 | 3.90 | 6.41 |
| 5 | 56.47 | 13.82 | 0.63 | 13.59 | 3.21 | 0.27 | 3.96 | 2.20 | 5.86 |
| 6 | 59.81 | 12.18 | 0.66 | 13.09 | 1.88 | 0.54 | 3.42 | 2.28 | 6.14 |
| 7 | 63.13 | 10.11 | 1.39 | 9.93 | 2.57 | 0.72 | 6.03 | 1.26 | 4.87 |

The polymer chains have higher molecular weight compared to those of Examples 1–3 and contain up to 6% racemic pentads with the isotaciticity remaining at greater than 50%. It seems that the catalyst accelerates the syndio/iso site transformation by increasing the "friction" between the growing polymer chain and the substituent favoring either the scission of the pending substituent or forcing its rearrangement.

TABLE 1

| Example | Cat (mg) | Poly.T (C ° C.)K | Act. g/g | MW xE3 | MWD | MP (° C.) | mmmm % | rrrr |
|---|---|---|---|---|---|---|---|---|
| 1 | 2 | 40 | 4.2 | 134 | 3.0 | 105.4 | 66.57 | 1.14 |
| 2 | 2 | 60 | 14.5 | 64 | 2.5 | 109.0 | 66.98 | 1.65 |
| 3 | 2 | 80 | 4.7 | 42 | 2.4 | 114.6 | 69.06 | 0.94 |

TABLE 2

| Example | mmmm | rmmm | rmmr | mmrr | rmrr + mrmm | mrmr | rrrr | mrrr | mrrm |
|---|---|---|---|---|---|---|---|---|---|
| 1 | 66.57 | 11.13 | 0.85 | 11.90 | 0.90 | 0.35 | 1.14 | 1.76 | 5.39 |
| 2 | 66.98 | 10.46 | 0.43 | 10.65 | 1.65 | 0.25 | 1.65 | 0.77 | 7.15 |
| 3 | 69.06 | 11.08 | 0.53 | 9.93 | 2.08 | 0.53 | 0.94 | 0.83 | 5.02 |

There exists a strong relationship between the molecular weight of the polymers and polymerization temperatures but the microstructure seems to be unaffected within the temperature range of 40-80° C. as shown in Table 2 which compares the methyl pentad intensity distributions for different temperatures. The increase of syndiotactic pentads with the polymerization temperature agrees with either the loss of the trimethylsilyl (TMS) group and the transforma-

TABLE 5

| Example | Poly.Time (min) | Act. (Kg/g) | MW (kDa) | MWD -- | mmmm (%) | rrrr (%) |
|---|---|---|---|---|---|---|
| 8 | 10 | 56 | 36 | 2.2 | 64.57 | 2.01 |
| 9 | 20 | 66 | 42 | 2.6 | 67.31 | 3.73 |
| 10 | 30 | 110 | 53 | 3.3 | 66.13 | 3.87 |

TABLE 5-continued

| Example | Poly.Time (min) | Act. (Kg/g) | MW (kDa) | MWD -- | mmmm (%) | rrrr (%) |
|---|---|---|---|---|---|---|
| 11 | 60 | 71 | 52 | 3.8 | 63.13 | 6.00 |
| 12 | 90 | 60 | 47 | 3.2 | 62.52 | 7.72 |
| 13 | 120 | 47 | 55 | 3.7 | 66.54 | 5.96 |

TABLE 6

| Example | mmmm | rmmm | rmmr | mmrr | rmrr + mrmm | mrmr | rrrr | mrrr | mrrm |
|---|---|---|---|---|---|---|---|---|---|
| 8 | 64.57 | 10.75 | 2.56 | 9.14 | 3.39 | 1.07 | 2.01 | 1.04 | 5.46 |
| 9 | 67.31 | 9.25 | 0.95 | 10.53 | 1.81 | 0.75 | 3.73 | 1.29 | 4.36 |
| 10 | 66.13 | 8.14 | 2.84 | 8.77 | 3.05 | 0.98 | 3.87 | 1.60 | 4.63 |
| 11 | 63.13 | 10.11 | 1.39 | 9.93 | 2.57 | 0.72 | 6.03 | 1.26 | 4.87 |
| 12 | 62.52 | 9.30 | 1.66 | 9.56 | 3.13 | 0.66 | 7.72 | 1.37 | 4.08 |
| 13 | 66.54 | 9.12 | 1.46 | 8.31 | 2.32 | 1.07 | 5.96 | 1.39 | 3.82 |

By increasing the polymerization temperature the tacticity of the polymer increases both with respect to isotactic and syndiotactic pentads. This leads to an increase of the crystallinity of the polymer. The increase of the polymerization time has little effect on the isotactic pentads but increases the syndiotactic pentads. The molecular weights are not affected by the polymerization time. The low molecular weight of the 10 and 20 minutes runs are due to relative higher hydrogen concentrations. Syndiotacticity as measured by "rrrr" pentad distribution increases to about 8%.

TABLE 7

| Solvent | mmmm | rmmm | rmmr | mmrr | rmrr + mrmm | mrmr | rrrr | mrrr | mrrm |
|---|---|---|---|---|---|---|---|---|---|
| 0 | 59.81 | 12.18 | 0.66 | 13.09 | 1.88 | 0.54 | 3.42 | 2.28 | 6.14 |
| Et | 47.1 | 13.38 | 3.42 | 12.85 | 5.57 | 3.45 | 3.40 | 5.03 | 5.81 |
| C5 | 65.44 | 11.15 | 0.92 | 12.01 | 1.62 | 0.49 | 1.39 | 1.61 | 5.37 |
| C6 | 70.34 | 9.89 | 1.25 | 9.79 | 1.63 | 0.23 | 0.77 | 1.68 | 4.41 |
| C7 | 69.22 | 10.23 | 0.77 | 10.63 | 2.08 | 0.32 | 0.98 | 1.49 | 4.28 |
| rs | 70.08 | 7.80 | 1.98 | 10.57 | 1.42 | 0.51 | 1.35 | 1.33 | 4.96 |

TABLE 8

| Solvent | mmmm | rmmm | rmmr | mmrr | rmrr + mrmm | mrmr | rrrr | mrrr | mrrm |
|---|---|---|---|---|---|---|---|---|---|
| 0 | 66.54 | 9.12 | 1.46 | 8.31 | 2.32 | 1.07 | 5.96 | 1.39 | 3.82 |
| C6 | 62.38 | 9.50 | 1.72 | 10.04 | 2.92 | 0.83 | 5.45 | 2.78 | 4.38 |
| C7 | 69.11 | 7.58 | 1.46 | 7.61 | 1.75 | 1.03 | 6.96 | 1.25 | 3.25 |
| C8 | 78.38 | 6.86 | 0.24 | 7.02 | 1.84 | 0.64 | 1.29 | 0.83 | 2.90 |

0 - no solvent
Et - Ether
C5 - pentane
C6 - hexane
C7 - heptane
C8 - octane
rs - residual material Successive fractionation of the polymer from Examples 6 and 13 as shown in Tables 7 and 8, respectively, with different solvents produced no polymer fraction with pure isotacticity or pure syndiotacticity. These results indicate a stereoblock structure rather than a physical mixture of individual discrete isotactic and syndiotactic polymer chains.

Obviously, numerous modifications and variations of the present invention are possible in light of the above teachings. It is therefore to be understood that within the scope of the appended claims, the invention may be practiced otherwise than as specifically described herein

What is claimed as new and desired to be secured by Letter of Patent of the United States of America is:

1. A process for polymerizing an olefin monomer to form a syndiotactic/isotactic block polyolefin comprising:

a) selecting a metallocene catalyst comprising:
1) a metallocene compound described by the formula

$$R''(C_5H_3R)(C_4R'_4C_5C_4R'_4)MeQ_p$$

wherein $(C_5H_3R)$ is a substituted cyclopentadienyl ring, R being a substituent in the distal position represented by general formula $SiR_3$, R is a hydrocarbyl radical having from 1–20 carbon atoms, each R being the same such that $(C_5H_3R)$ has a lack of bi-lateral symmetry; $(C_4R'_4C_5C_4R'_4)$ is fluorenyl or a substituted fluorenyl ring, R' being hydrogen or a hydrocarbyl radical having from 1–20 carbon atoms, a halogen, an alkoxy, an alkoxy alkyl or an alkylamino radical; R" is a structural bridge between the $(C_5H_3R)$ and $(C_4R'_4C_5C_4R'_4)$ rings to impart stereorigidity; Q is a hydrocarbyl radical having 1–20 carbon atoms or is a halogen; Me is titanium, zirconium or hafnium; and p is the valence of Me minus 2, and 2) an alumoxane cocatalyst;

b) introducing the catalyst into a polymerization reaction zone containing an olefin monomer selected from the group of olefins having three or more carbon atoms and maintaining the reaction zone under polymerization reaction conditions; and c) extracting a syndiotactic/isotactic block polymer.

2. The process of claim 1 wherein $(C_5H_3R)$ is 3-trimethylsilyl cyclopentadienyl radical.

3. The process of claim 1 wherein $(C_4R'_4C_5C_4R'_4)$ is an unsubstituted fluorenyl radical.

4. The process of claim 1 wherein R" is selected from the group consisting of linear alkyl biradicals of 1–10 carbon atoms or branched alkyl biradicals of 1–20 carbon atoms.

5. The process of claim 1 wherein R" is an isopropylidene or a diphenylmethylidene radical.

6. The process of claim 1 wherein $R"(C_5H_3R)$ $(C_4R'_4C_5C_4R'_4)$ is an isopropylidene (3-trimethylsilyl cyclopentadienyl-9-fluorenyl) or diphenylmethylidene (3-trimethylsilylcyclopentadienyl-9-fluorenyl) radical.

7. The process of claim 1 further comprising prepolymerizing the catalyst prior to introducing it into the reaction zone, said step of prepolymerizing including contacting the catalyst with an olefin monomer and an alumoxane.

8. The process of claim 1 wherein Q is chlorine.

9. The process of claim 1 wherein the metallocene compound is diphenylmethylidene[3-trimethylsilylcyclopentadienyl-9-fluorenyl]Me dichloride where Me is zirconium or hafnium.

10. The process of claim 1 wherein the metallocene compound is isopropylidene[3-trimethylsilylcyclopentadienyl-9-fluorenyl]Me dichloride where Me is zirconium or hafnium.

11. The process of claim 1 wherein syndiotactic/isotactic block polymer has syndiotacticity of about 8%.

12. The process of claim 1 wherein syndiotactic/isotactic block polymer has syndiotacticity of about 6%.

13. The process of claim 1 wherein syndiotactic/isotactic block polymer has syndiotacticity of about 1 to about 1.7%.

14. The process of claim 1 wherein syndiotactic/isotactic block polymer has isotacticity of greater than 50%.

15. The process of claim 1 wherein the olefin monomer is propylene.

16. The process of claim 1 wherein R' is a diphenylmethylio biradical.

17. A process for polymerizing an olefin monomer to form a syndiotactic/isotactic block polyolefin comprising:

a) selecting a metallocene catalyst comprising:

1) a metallocene compound described by the formula

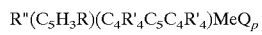

wherein $(C_5H_3R)$ is a substituted cyclopentadienyl ring, R being a substituent in the distal position having a spatial displacement at least as great as trimethylsilyl represented by general formula XR*y wherein X is an atomic element, R* is a hydrocarbyl radical having from 1–20 carbon atoms, each R being the same and wherein y is the valence of X minus 1 such that $(C_5H_3R)$ has a lack of bi-lateral symmetry; $(C_4R'_4C_5C_4R'_4)$ is fluorenyl or a substituted fluorenyl ring, R' being hydrogen or a hydrocarbyl radical having from 1–20 carbon atoms, a halogen, an alkoxy, an alkoxy alkyl or an alkylamino radical; R" is a diphenylmethylio biradical structural bridge between the $(C_5H_3R)$ and $(C_4R'_4C_5C_4R'_4)$ rings to impart stereorigidity; Q is a hydrocarbyl radical having 1–20 carbon atoms or is a halogen; Me is titanium, zirconium or hafnium; and p is the valence of Me minus 2, and 2) an alumoxane cocatalyst;

b) introducing the catalyst into a polymerization reaction zone containing an olefin monomer selected from the group of olefins having three or more carbon atoms and maintaining the reaction zone under polymerization reaction conditions; and c) extracting a syndiotactic/isotactic block polymer.

18. The process of claim 17 wherein $(C_5H_3R)$ is 3-trimethylsilyl cyclopentadienyl radical.

19. The process of claim 17 wherein $(C_4R'_4C_5C_4R'_4)$ is an unsubstituted fluorenyl radical.

20. The process of claim 17 wherein $R"(C_5R_4)$ $(C_4R^1_4C_5C_4R'_4)$ is a diphenylmethylidene (3-trimethylsilyl cyclopentadienyl-9-fluorenyl) radical.

21. The process of claim 17 further comprising prepolymerizing the catalyst prior to introducing it into the reaction zone, said step of prepolymerizing including contacting the catalyst with an olefin monomer and an alumoxane.

22. The process of claim 17 wherein Q is chlorine.

23. The process of claim 17 wherein the R substituent in the distal position is represented by general formula SiR*3 wherein R* is a hydrocarbyl radical having from 1-20 carbon atoms, each R being the same.

24. The process of claim 21 wherein the metallocene compound is diphenylmethylidene(3-trimethylsilyl cyclopentadienyl-9-fluorenyl)Me dichloride where Me is zirconium or hafnium.

25. The process of claim 17 wherein syndiotactic/isotactic block polymer has syndiotacticity of about 8%.

26. The process of claim 17 wherein syndiotactic/isotactic block polymer has syndiotacticity of about 6%.

27. The process of claim 17 wherein syndiotactic/isotactic block polymer has syndiotacticity of about 1 to about 1.7%.

28. The process of claim 17 wherein syndiotactic/isotactic block polymer has isotacticity of greater than 50%.

29. The process of claim 17 wherein the olefin monomer is propylene.

* * * * *